July 17, 1956     W. R. SANER     2,755,186

PHOTOGRAPHIC FILMS

Filed July 19, 1954

Fig. 1

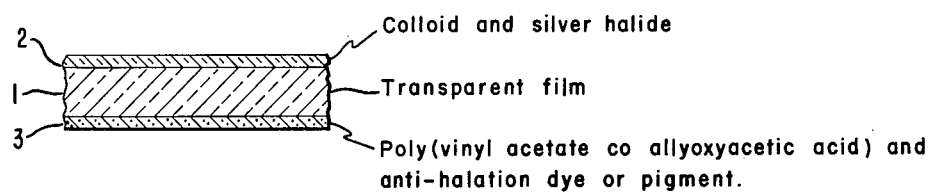

- 2 — Colloid and silver halide
- 1 — Transparent film
- 3 — Poly(vinyl acetate co allyoxyacetic acid) and anti-halation dye or pigment.

Fig. 2

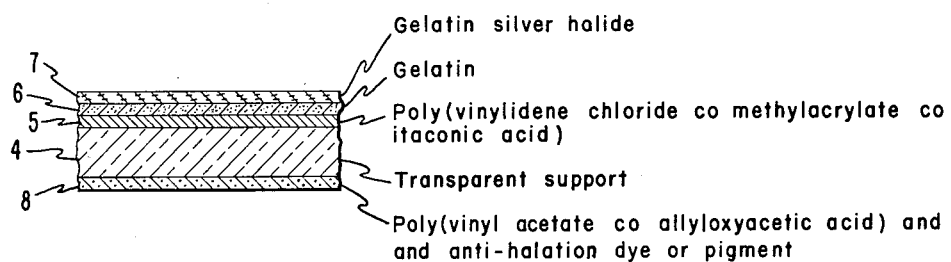

- 7 — Gelatin silver halide
- 6 — Gelatin
- 5 — Poly(vinylidene chloride co methylacrylate co itaconic acid)
- 4 — Transparent support
- 8 — Poly(vinyl acetate co allyloxyacetic acid) and and anti-halation dye or pigment

INVENTOR
WILLIAM RUSSELL SANER

BY Lynn Barratt Morris

ATTORNEY

United States Patent Office 2,755,186
Patented July 17, 1956

---

2,755,186

PHOTOGRAPHIC FILMS

William Russell Saner, Scotch Plains, N. J., assignor to E. I. du Pont de Nemours and Company, Wilmington, Del., a corporation of Delaware Application July 19, 1954, Serial No. 444,369

8 Claims. (Cl. 95—9)

This invention relates to photographic films and plates having a novel removable anti-halation layer. More particularly it relates to such elements wherein the anti-halation layer comprises a poly(vinyl acetate co allyloxyacetic acid), or a water-soluble salt thereof and an anti-halation dye or pigment. Still more particularly, it relates to photographic films having a base composed of a polyethylene terephthalate having such an anti-halation layer on its back surface.

Various natural and synthetic colloids, resins, cellulose derivatives and other materials have been proposed for use in anti-halation layers. These materials vary in constitution and properties. Some are soluble in acidic solutions, some in basic solutions, others in alcohol solutions. The prior art materials, which have been used as the film-forming binding agents in anti-halation layers, while being strongly adherent to cellulosic films, in general, do not have good adherence to polyethylene terephthalate film surfaces.

An object of this invention is to provide new and improved anti-halation layers. Another object is to provide such layers which can be removed readily from films and plates by weakly alkaline solutions. A further object is to provide such layers which have good adherence to polyethylene terephthalate film surfaces but can be removed easily during the processing of the exposed film after development, by a simple washing step. Still other objects will be apparent from the following description of the invention.

The above objects are attained in accordance with the present invention by using as the film-forming binding agent for the anti-halation or pigment a poly(vinyl acetate co allyloxyacetic acid) or a water-soluble salt thereof, e. g., an alkali metal, ammonium or amine salt, or a dye salt thereof, preferably containing a sufficient number of lateral —CH$_2$OCH$_2$COOM units, where M is hydrogen, an alkali metal, ammonium, substituted ammonium, or amine group, or a dye nucleus, to render the copolymer swellable or soluble in dilute alkaline photographic developer solutions.

Poly(vinyl acetate co allyloxyacetic acid) containing 1% to 95% of polymerized allyloxyacetic acid can be made by copolymerizing a mixture of allyloxyacetic acid and vinyl acetate at a temperature between 0° C. and 180° C., or more, in an inert liquid, e. g., benzene, toluene, xylene, dioxane and methyl isobutyl ketone, in the presence of a polymerization catalyst or initiator, including an organic or inorganic peroxide, or an azo compound, e. g., $\alpha,\alpha'$-azodiisobutyronitrile or $\alpha,\alpha'$-azodiisobutyrate. The copolymerization can be carried out at normal or superatmospheric pressures. The salts can be made by neutralizing the acid with a suitable alkali metal hydroxide, ammonium hydroxide, tetramethyl or tetraethyl ammonium hydroxide or amine or basic dye. Suitable amines include mono-, di-, and tri-ethyl amine, N-diethylethanolamine, diethanolamine, cyclohexyl amine, piperidine and pyridine.

The anti-halation coating composition can be made by dissolving the copolymer in water and/or ethanol and admixing or dispersing therein the anti-halation dye or pigment. If desired, a chlorinated or other solvent which has a swelling action on the surface of the film to be coated can be used.

The invention is further illustrated but is not intended to be limited by the following examples.

Example I

A photographic film comprising a polyethylene terephthalate base, having in order, on the surface, a poly-85:15:2(vinylidene chloride co methyl acrylate co itaconic acid) sublayer and a gelatin layer (the copolymer coated polyester base being made and oriented after the manner described in Example I of Alles and Saner, U. S. Patent 2,627,088), was provided with a removable anti-halation layer by coating its other surface, at room temperature, with the following solution:

| Component | Parts by Weight |
|---|---|
| Poly-88.8:11.2 (vinyl acetate co allyloxy acetic acid) (Acid No. 54.2; inherent viscosity 0.27 at 25° C.)—2% conc. in CHCl$_3$ | 4.0 |
| Acid Magenta O (Colour Index No. 692) | 0.5 |
| Ethanol | 96.0 |

After application of the dye solution, the anti-halation layer was dried at 49° C., and heated for two minutes at 100° C. A gelatino-silver iodo bromide emulsion (1.54 mole percent silver iodide and 98.46 mole percent silver bromide) having a gelatin to silver bromide ratio of 1.29 was coated onto the gelatin sublayer. The anti-halation layer had good dry adhesion to the polyester film base. The film element bearing the light-exposed emulsion was developed for three minutes in a solution made by admixing the components, as follows:

| | | |
|---|---|---|
| Water | cc | 975.0 |
| p-N-Methylaminophenol sulfate | grams | 1.4 |
| Sodium sulfite, anhydrous | do | 60.0 |
| Hydroquinone | do | 6.2 |
| Sodium carbonate, mono-hydrate | do | 56.0 |
| Potassium bromide | do | 1.8 |

Water to make 1.0 liter.

On washing in water the dye was completely discharged and the backing was completely removed, leaving no stain.

Example II

The procedure of Example I was repeated except that poly(vinyl acetate co allyloxyacetic acid) (94.6/5.4) having an inherent viscosity of 0.55 at 25° C. and 0.1% concentration in chloroform was used as the copolymer.

Example III

To the other surface of the photographic film base described in Example I there was applied, at room temperature, the following solution:

| | Grams |
|---|---|
| Poly(vinyl acetate co allyloxyacetic acid) (91.6/8.4) | 2 |
| Acid Magenta O | 0.1 |
| Ethyl alcohol (95%) | 16.0 |
| Methyl chloride | 98.0 |

The copolymer, in this instance, had an inherent viscosity determined at 25° C. and 0.1% in chloroform of 0.29. After drying at 49° C. the anti-halation layer exhibited good adhesion and scratch resistance. It was developed and washed as described in Example I. The dye discharge rapidly in the developer. The copolymer layer swelled rapidly but was not removed until the film was immersed in water and then was completely removed, leaving no dye stain on the base film.

*Example IV*

The procedure of Example I was repeated except that the anti-halation layer was applied, at room temperature, from the following solution:

| | Grams |
|---|---|
| Copolymer of Example III | 2 |
| Di-ortho-tolylguanidine salt of Ink Blue (C. I. No. 706) | 0.1 |
| Acid Magenta O | 0.1 |
| 28% ammonium hydroxide | 10.0 |
| Water | 90.0 |

The results were similar to those described in Example III.

*Example V*

The procedure of Example III was repeated except that the anti-halation layer was applied at room temperature from the following solution:

| | Grams |
|---|---|
| Copolymer of Example III | 2 |
| Di-ortho-tolylguanidine salt of Ink Blue | 0.2 |
| Acid Magenta O | 0.2 |
| Ethanol | 98.0 |

The results were similar to those described in Example III.

The copolymers used in the invention may contain 5% to 99% by weight of vinyl acetate, but as stated above, preferably contain a sufficient number of allyloxyacetic acid or acid salt groups to render the copolymers soluble in dilute aqueous alkaline solutions. An amount of at least 4% by weight of the total weight of the copolymer is usually required for this purpose. The amount usually will not have to be over 25% but, of course, larger amounts up to 75% or more can be used. Amounts within the range 4% to 25% cause the anti-halation layers to swell rapidly during the short times of development. This swelling action allows them to be rapidly and completely removed during the conventional washing step after development. If desired, the layers can be removed prior to development by an alkaline bath, e. g., 5% aqueous $Na_2CO_3$.

The polyethylene terephthalate film base may be made from any highly polymeric ester of a polymethylene glycol containing 2 to 10 methylene groups and terephthalic acid or a dimethyl or diethyl ester or acid bromide or chloride thereof and may have a resinous sublayer composed of a copolymer containing at least 35% by weight of vinylidene chloride, which base has been biaxially oriented and provided with a water-permeable colloid anchoring layer that is adapted to receive a water-permeable colloid silver halide layer or layers. Various suitable films of this type are described in U, S. P. 2,627,088, and any of the tri-component copolymers containing vinylidene chloride that are described in that patent may comprise the sublayer on the polyester base.

The non-halation layers may contain up to 50% by weight of the light-absorbing dye or pigment. A preferred range is from 5 to 25%. In general, the density of the non-halation layer, to light of the wavelength to which the light-sensitive emulsion layer or layers on the obverse side of the light-transmitting support are sensitive, should be at least 0.30 and may range up to 1.0 or higher. Lower densities will give lesser protection.

A variety of pigments and dyes may be used as the light-absorbing medium. These may be chosen to absorb light of particular spectral characteristics or may be chosen to absorb light at all wavelengths (i. e., a black dye or pigment). Among useful dyes and pigments, in addition to those given in the examples, are carbon black, Nigrosine WN, Pontachrome Black PV, Colour Index (C. I.) No. 170, Pontacyl Light Green SF (C. I. 670), Pontacyl Brilliant Blue A (C. I. No. 714), Wool Violet S (C. I. No. 50), Lithosol Red C (C. I. 165), Auramine (C. I. 655), Helianthin (C. I. 142, 146), Brilliant Yellow S (C. I. 144), Chrysoin (C. I. 148), Acid Blue Black (C. I. 246), Rhodamine (C. I. 749, 750, 751, 746, 753, 761, 763), Fuchsin (C. I. 677), Safranine G (C. I. 841), Ponceau 6R (C. I. 186), Crocein Scarlet (C. I. 277, 251, 286, 252, 291, 183), Azorubin (C. I. 179), Safranine O (C. I. 841), Ponceau 2R (C. I. 79), Spirit Solution Nigrosine (C. I. 864) and Metanil Yellow (C. I. 138). Basic dyes, e. g., Ethyl Violet (C. I. 682), Benzyl Violet (C. I. 683), Victoria Blue 4R (C. I. 690), Para Roseine (C. I. 676), New Roseine O (C. I. 678), Methyl Violet 2B (C. I. 680), Crystal Violet (C. I. 681), Night Blue (C. I. 731), New Green (C. I. 730) may also be used, in which case, a polymeric dye salt is formed with the acid groups in the copolymer. The basic dye may be reacted with the copolymer first, in which case the polymeric dye salt may first be isolated and then redissolved in a suitable solvent to prepare a coating solution.

Referring now to the drawing:

Figure 1 is a schematic sectional view of a photographic element described above and Figure 2 is a schematic sectional view of a photographic film of the type described in Example I.

The photographic element of Figure 1 comprises a transparent support 1 bearing on one surface a colloid silver halide layer 2 and on the opposite surface an anti-halation layer 3 comprising poly(vinyl acetate co allyloxyacetic acid) and an anti-halation dye or pigment.

The photographic element of Figure 2 comprises a transparent film base 4 bearing on its upper surface in order a poly(vinylidene chloride co methyl acrylate co itaconic acid) layer 5, a gelatin sublayer 5 and a gelatin silver halide emulsion layer 7, and on its reverse surface a layer 8 of poly(vinyl acetate co allyloxyacetic acid) and an anti-halation dye.

The anti-halation layers are useful in photographic films of various types, e. g., portrait films, motion picture film, including multilayer color film, document recording film, etc.

The anti-halation layers have strong adherence to the conventional supports used in the art, e. g., glass, films composed of cellulose acetate, cellulose acetate proprionate, cellulose acetate butyrate, cellulose propionate poly(vinyl chloride), poly(vinyl chloride co vinyl acetate), poly(styrene), poly(methylacrylate), poly(methylmethacrylate) and poly(vinylbutyral).

An advantage of the invention is that it provides a new kind of anti-halation layer, which is smooth, non-hygroscopic, scratch-resistant and flexible. Another advantage is that the layer is strongly adherent, when dry, to the usual types of film base, but is readily removable after development. A further advantage is that the layer is strongly adherent to polyethylene terephthalate films. A still further advantage is that the copolymers used are relatively inexpensive and can be coated in the form of thin layers which can be quickly dried. Yet another advantage is that the anti-halation dyes and pigments can be uniformly dispersed, without agglomeration, in the copolymer-coating solutions.

The embodiments of the invention in which an exclusive property or privilege is claimed are defined as follows.

I claim:

1. A photographic element comprising a support which transmits light, a light-sensitive silver halide layer on one surface of the support, and an anti-halation layer on the other surface of the support, comprising a polymeric material taken from the class consisting of poly(vinyl acetate co allyloxyacetic acid) and its water-soluble salts and basic dye salts, said layer having dispersed therethrough an anti-halation material taken from the group consisting of dyes and pigments.

2. A photographic element comprising a support which transmits light, a light-sensitive silver halide layer on one surface of the support, and an anti-halation layer on the other surface of the support, comprising a polymeric material taken from the class consisting of poly(vinyl acetate co allyloxyacetic acid) containing 5% to 99% by weight of vinyl acetate, and its water-soluble salts and basic dye salts, said layer having dispersed therethrough an anti-halation material taken from the group consisting of dyes and pigments.

3. A photographic element comprising a support which transmits light, a light-sensitive silver halide layer on one surface of the support, and an anti-halation layer on the other surface of the support, comprising a polymeric material taken from the class consisting of poly(vinyl acetate co allyloxyacetic acid), containing 5% to 99% by weight of vinyl acetate, said layer having dispersed therethrough an anti-halation material taken from the group consisting of dyes and pigments.

4. A photographic element comprising a support which transmits light, a light-sensitive silver halide layer on one surface of the film, and an anti-halation layer on the other surface of the film, comprising a polymeric material taken from the class consisting of poly(vinyl acetate co allyloxyacetic acid) containing 75% to 96% by weight of vinyl acetate, said layer having dispersed therethrough an anti-halation material taken from the group consisting of dyes and pigments.

5. An element as set forth in claim 4 wherein said anti-halation material comprises acid Magenta O.

6. A photographic film comprising a polyethylene terephthalate film base bearing in order, on one surface, a layer of a copolymer containing at least 35% by weight of vinylidene chloride, a water-permeable colloid sublayer and at least one water-permeable colloid silver halide emulsion layer, and on the other surface a layer comprising polymeric material taken from the class consisting of poly(vinyl acetate co allyloxyacetic acid) containing 75% to 96% by weight of vinyl acetate, and its water-soluble salts and basic dye salts, said layer having dispersed therethrough an anti-halation material taken from the group consisting of dyes and pigments.

7. A photographic film comprising a polyethylene terephthalate film base bearing in order, on one surface, a layer of a copolymer containing at least 35% by weight of vinylidene chloride, a water-permeable colloid sublayer and at least one water-permeable colloid silver halide emulsion layer, and on the other surface a layer comprising a poly(vinyl acetate co allyloxyacetic acid) containing 75% to 96% by weight of vinyl acetate, said layer having dispersed therethrough an anti-halation material taken from the group consisting of dyes and pigments.

8. A photographic film comprising a polyethylene terephthalate film base bearing in order on one surface a layer of a poly(vinylidene chloride co methyl acrylate co itaconic acid) containing 35 to 96%, 35.0 to 64.5% and 0.5% to 25% by weight, respectively, of said components, a water-permeable colloid sublayer and at least one water-permeable colloid silver halide emulsion layer, and on the other surface a layer comprising a polymeric material taken from the class consisting of poly(vinyl acetate co allyloxyacetic acid) containing 75% to 96% by weight of vinyl acetate, and its water-soluble salts and basic dye salts, said layer having dispersed therethrough an anti-halation material taken from the group consisting of dyes and pigments.

References Cited in the file of this patent
UNITED STATES PATENTS 2,606,834     Saner     Aug. 12, 1952